(12) United States Patent
Fasola et al.

(10) Patent No.: US 12,122,370 B2
(45) Date of Patent: Oct. 22, 2024

(54) COLLISION DETECTION SYSTEM FOR AUTONOMOUS VEHICLE

(71) Applicant: GM Cruise Holdings LLC, San Francisco, CA (US)

(72) Inventors: Juan Fasola, San Francisco, CA (US); Xiaoyu Zhou, San Francisco, CA (US); Eugene Lo, Redwood City, CA (US); Shreyans Kushwaha, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 192 days.

(21) Appl. No.: 17/841,469

(22) Filed: Jun. 15, 2022

(65) Prior Publication Data
US 2023/0406292 A1    Dec. 21, 2023

(51) Int. Cl.
*B60W 30/09* (2012.01)
*G07C 5/00* (2006.01)

(52) U.S. Cl.
CPC ............ *B60W 30/09* (2013.01); *G07C 5/008* (2013.01); *B60W 2420/408* (2024.01); *B60W 2554/4042* (2020.02); *B60W 2554/4044* (2020.02); *B60W 2556/45* (2020.02)

(58) Field of Classification Search
CPC ......... B60W 30/09; B60W 2554/4042; B60W 2554/4044; G07C 5/008
USPC ........................................................ 701/24
See application file for complete search history.

(56) References Cited

U.S. PATENT DOCUMENTS

| | | | |
|---|---|---|---|
| 10,949,885 B2* | 3/2021 | Xiao | A61B 5/08 |
| 11,427,195 B1* | 8/2022 | Pertsel | B60L 58/12 |
| 11,922,462 B2* | 3/2024 | Xiao | B60R 11/04 |
| 2020/0294401 A1* | 9/2020 | Kerecsen | G08G 1/205 |
| 2021/0094577 A1* | 4/2021 | Shalev-Shwartz | B60W 30/181 |
| 2021/0116256 A1* | 4/2021 | Konrardy | G06Q 50/265 |
| 2021/0300306 A1* | 9/2021 | Costin | B60T 7/22 |
| 2021/0323541 A1* | 10/2021 | Zhu | B60W 60/0059 |
| 2022/0144258 A1* | 5/2022 | Lind | B60W 30/0953 |
| 2022/0283311 A1* | 9/2022 | Zhou | G01S 7/4817 |
| 2023/0140569 A1* | 5/2023 | Foster | G01C 21/3415 |
| | | | 701/400 |
| 2023/0305161 A1* | 9/2023 | Leng | G01S 17/87 |
| 2023/0331298 A1* | 10/2023 | Alghooneh | B60W 50/14 |

(Continued)

FOREIGN PATENT DOCUMENTS

| | | | | |
|---|---|---|---|---|
| CN | 101497330 B | * | 10/2011 | ......... B62D 15/0265 |
| EP | 3745158 A1 | * | 12/2020 | ............ B60W 30/08 |

*Primary Examiner* — Atul Trivedi

(57) ABSTRACT

A method is described and includes receiving an indication that a collision between a vehicle and an object is predicted; processing first sensor data obtained from a first onboard sensor of the vehicle to determine whether an actual occurrence of the predicted collision can be confirmed from the first sensor data and if not, processing second sensor data obtained from a second onboard sensor of the vehicle to determine whether the actual occurrence of the predicted collision can be confirmed from the second sensor data. If the actual occurrence of the predicted collision is confirmed from one of the first sensor data and the second sensor data, determining a severity of the collision based on the indication and the one of the first sensor data and the second sensor data; and prompting an action to be based on the determined severity of the collision.

20 Claims, 5 Drawing Sheets

(56) References Cited

U.S. PATENT DOCUMENTS

2023/0339502 A1* 10/2023 Chi-Johnston ......... G06N 20/00
2023/0406292 A1* 12/2023 Fasola ................... B60W 30/09

* cited by examiner

COLLISION DETECTION SYSTEM FOR AUTONOMOUS VEHICLE

TECHNICAL FIELD OF THE DISCLOSURE

The present disclosure relates generally to rideshare services provided using autonomous vehicles and, more specifically, to techniques for collision detection in connection with operation of autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

Figure 1:
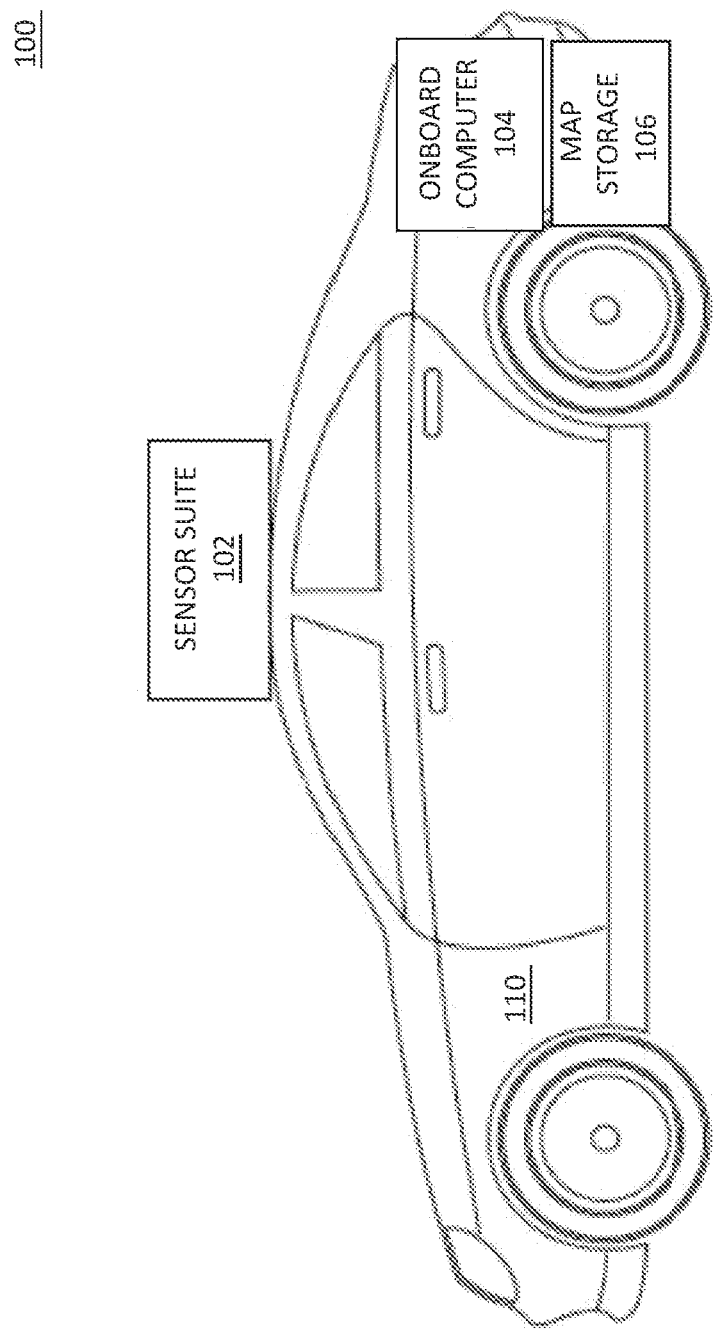
FIG. 1 is a diagram illustrating an example autonomous vehicle according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

In accordance with features of embodiments described herein, a collision detection system for autonomous vehicles may combine input from a collision imminent detection (CID) system and one or more onboard sensors, which may include one or more of an inertial measurement unit (IMU), a Light Detection and Ranging sensor (LIDAR), and a camera, to accurately determine whether contact between the autonomous vehicle and another object has occurred. In operation, a signal from the CID indicating that an imminent collision has been detected may trigger the collision detection system described herein to check the IMU signal, the LIDAR point cloud and/or camera images obtained proximate the time of the predicted imminent collision to confirm whether the predicted imminent collision actually took place. Because each of the three signals (IMU signal, LIDAR point cloud, and camera images) have different limitations, or "blind spots," the collision detection system may be designed such that the collision may be detected, or "confirmed," using only some portion of the signals that provide a clear affirmative indication of collision, so that the limitations of some sensors may be overcome by other sensors while not sacrificing accuracy of the collision detection system.

In alternative embodiments, other sensors may be combined with or substituted for the IMU, LIDAR, and/or camera, including, for example tactile capacitive sensors (TACTs) placed in various locations on the outside of the autonomous vehicle.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, LIDAR, GPS, IMUs, TACTs, accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, an airplane, a bike, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet

Figure 2:
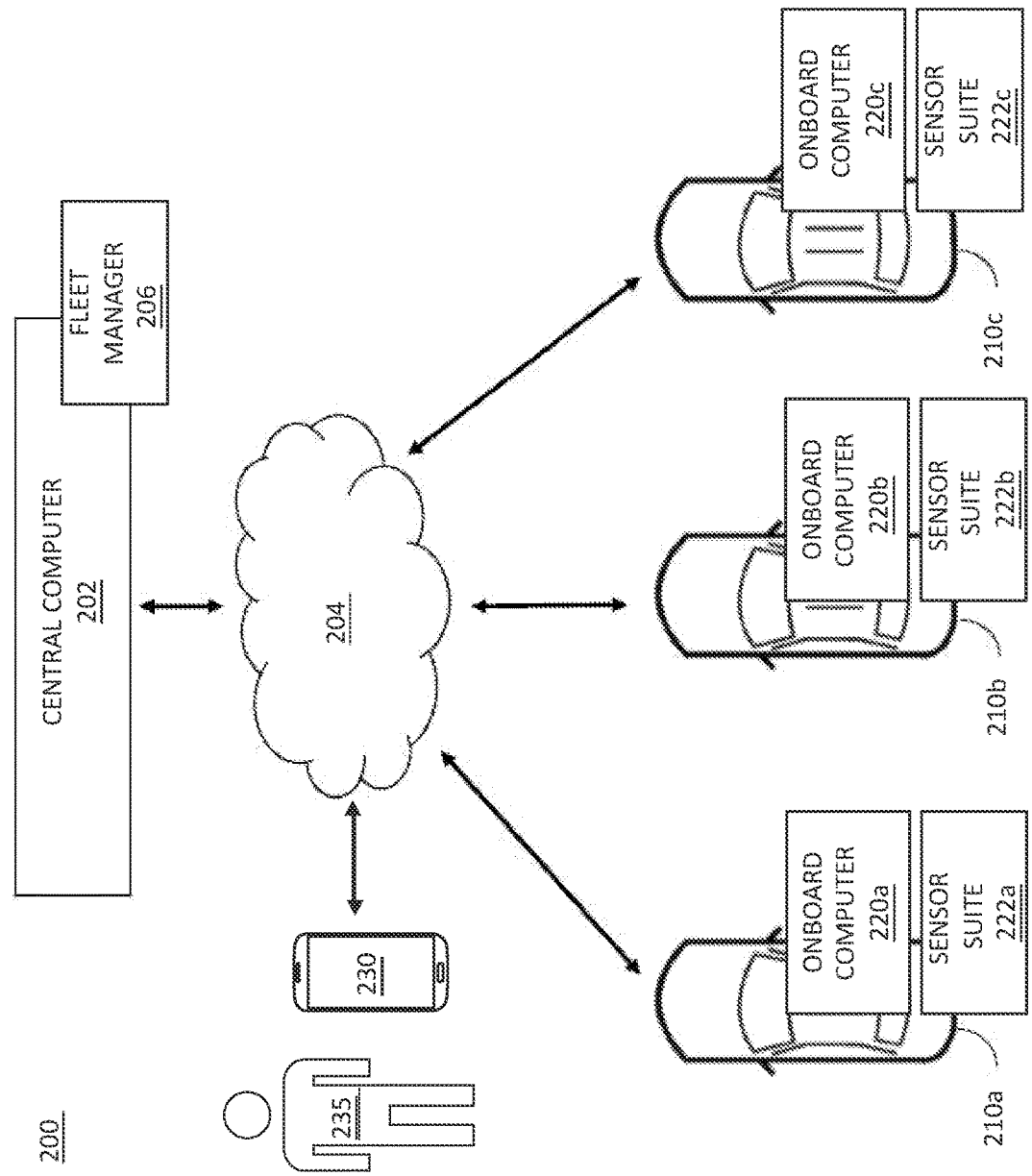
FIG. 2 is a diagram illustrating an example fleet of autonomous vehicles according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive rideshare service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for rideshare service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the rideshare service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Central computer 202 may include a model trainer for training classification models used to classify objects by applying machine learning techniques to training data. Classification models may be downloaded to onboard computers 220a, 220b, 220c, for use in classifying objects encountered by the autonomous vehicle 210a, 210b, 210c.

Example Onboard Computer

Figure 3:
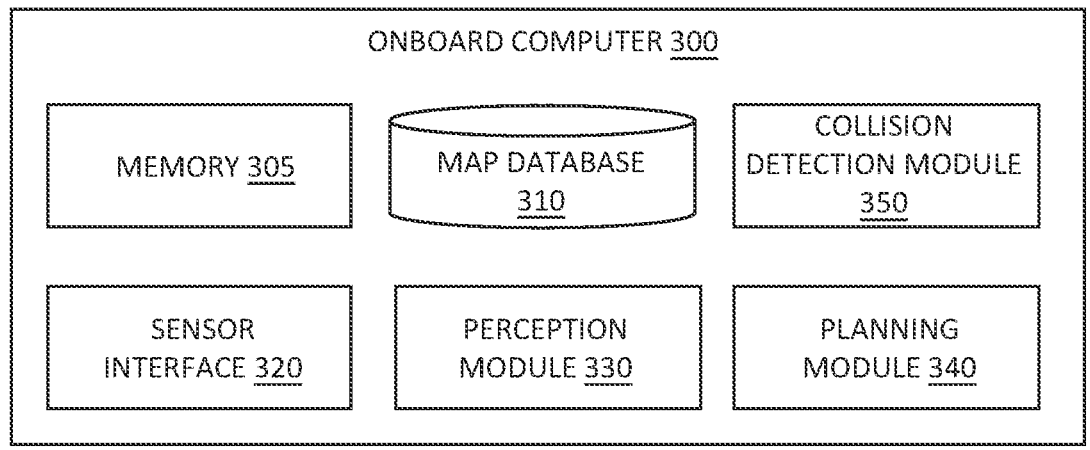
FIG. 3 is a diagram illustrating an onboard computer according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and collision detector module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 140 (FIG. 1)).

The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, an IMU sensor, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The collision detector module 350 may interact with other modules of the onboard computer 300 and other modules and systems to control and provide various aspects of the functionality and features of embodiments described herein and particularly as described below with reference to FIGS. 5-6.

Example Fleet Management System

Figure 4:
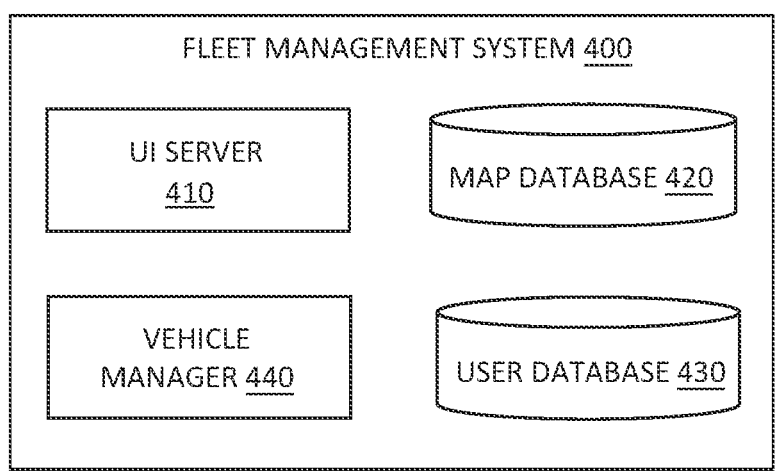
FIG. 4 is a diagram illustrating a fleet management system according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, and a vehicle manager 440. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

Example Method for Collision Detector Implementation and Operation

Figure 5:
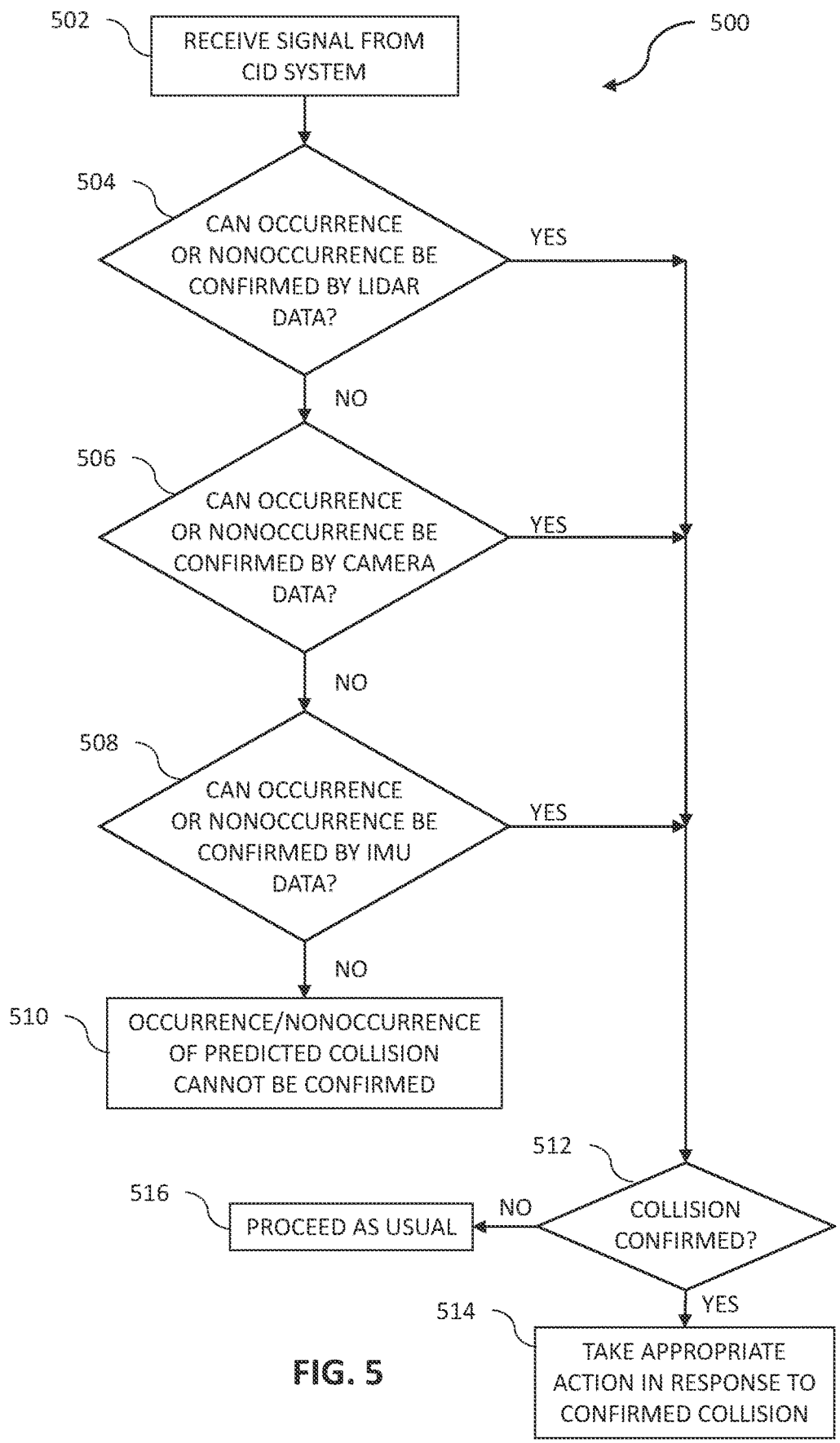
FIGS. 5-6 are flowcharts illustrating example processes of local assistance system according to some embodiments of the present disclosure.
Figure 6:
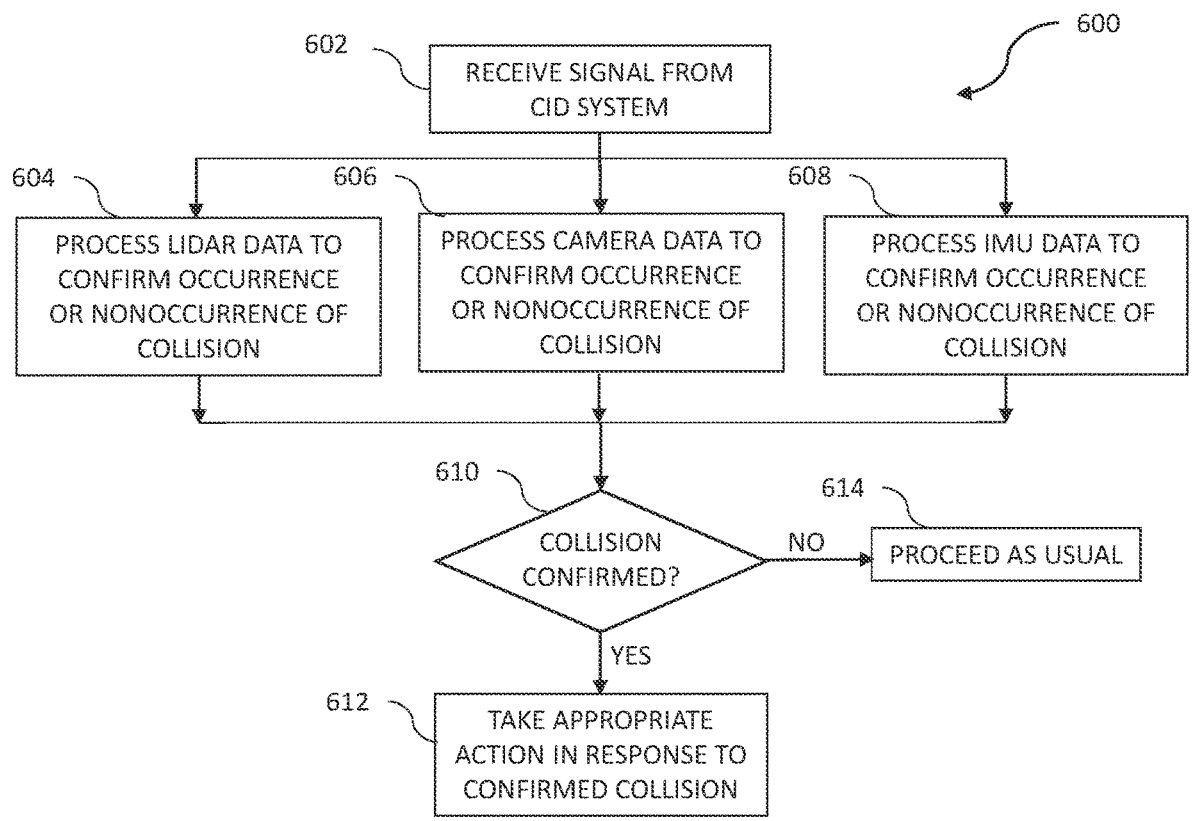

FIGS. 5-6 are flowcharts illustrating example processes for a collision detector system for an autonomous vehicle rideshare service according to some embodiments of the present disclosure. One or more of the steps illustrated in FIGS. 5-6 may be executed by one or more of the elements shown in the preceding figures.

In certain embodiments, a CID associated with an autonomous vehicle may predict whether the autonomous vehicle will be involved in a collision within a certain period of time (e.g., 2 seconds). The CID makes the prediction using inter alia a current location and situation of the autonomous vehicle, a planned path of the autonomous vehicle, and LIDAR data of the autonomous vehicle (e.g., to detect objects around the autonomous vehicle and to track the motion of those objects). the collision detector receives as an input a signal from a collision imminent detection system (CID). It will be recognized that a predicted collision is just that: a prediction, and that a predicted collision may not actually occur. Accordingly, a collision detector as described herein takes as an input a collision prediction from the CID and confirms whether or not the predicted collision has actually occurred so that appropriate action may be taken.

FIG. 5 is a flowchart illustrating an example method 500 for a collision detector system for an autonomous vehicle rideshare service in accordance with features of embodiments described herein.

In step 502, operation or initiation of the collision detector system may be triggered by receipt of a CID signal from a CID of the autonomous vehicle. In particular embodiments, the CID signal may include information regarding one or more of a timing of the predicted collision (e.g., within two seconds), classification the object(s) involved in the predicted collision, location(s) of the object(s) involved in the predicted collision, and motion (e.g., speed, rate of acceleration, and/or direction of travel) of the object(s) in the predicted collision. In certain embodiments, the information received from the CID in the CID signal provides context to the collision detector system regarding the predicted collision to provide the collision detector with a "starting point" from which to monitor the predicted collision.

In step 504, LIDAR data (e.g., in the form of a LIDAR point cloud) from the autonomous vehicle's onboard LIDAR sensor(s) may be processed to determine whether the LIDAR data can be used to confirm whether or not the predicted collision actually occurred. As previously noted, due to their location and position on the autonomous vehicle, onboard LIDAR sensors may have blind spots with respect to certain areas around the vehicle; therefore, it is possible that the LIDAR data alone cannot be used to confirm whether or not the predicted collision has occurred, in which case execution may proceed to step 506.

In step 506, camera data (e.g., in the form of images) from the autonomous vehicle's onboard camera(s) may be processed to determine whether the camera data can be used to confirm whether or not the predicted collision actually occurred. Camera data may cover some or all of the potential blind spots of an autonomous vehicle's LIDAR sensor(s); however, as also previously noted, onboard cameras may also have blind spots that may overlap with the blind spots of the LIDAR sensor(s); therefore, it is possible that the camera data alone cannot be used to positively confirm whether or not the predicted collision has occurred, in which case execution proceeds to step 508.

In step 508, IMU data from the autonomous vehicle's onboard IMU sensor(s) may be processed to determine whether the IMU data can be used to confirm whether or not the predicted collision actually occurred. Due to the location of onboard IMU sensor(s), it is possible (e.g., in cases where the collision was light or occurred in an area of the autonomous vehicle that was not near an onboard IMU), IMU data may have blind spots that may overlap with the blind spots of a LIDAR sensor and/or that of a camera; therefore, it is possible that the IMU data alone cannot be used to positively confirm whether or not the predicted collision has occurred, in which case execution proceeds to step 510.

In step 510, it is determined that it cannot be confirmed whether or not the predicted collision occurred; in other words, the sensor data is inconclusive on this point. In such instances, a decision as to what action to take may be based on the severity of the damage that would result should the predicted collision have occurred. Alternatively, a decision as to what action to take may be based on a "best guess" from the available information.

If in any of steps 504, 506, and 508, it is possible to determine from the corresponding data whether or not the predicted collision actually occurred, execution proceeds to step 512, in which a determination is made whether occurrence of the predicted collision has been confirmed. If so, execution proceeds to step 514; otherwise, execution proceeds to step 516.

In step 514, action is taken in response to confirmation of the collision. For example, the collision may be reported to the fleet management system and/or to a remote assistance operator so that appropriate action may be taken to address the situation. In certain embodiments, the collision detection system may further determine a severity of the confirmed collision (e.g., using the CID information combined with the LIDAR, camera, and/or IMU data), which may be used to decide how to address the collision. For example, in some instances, a repair technician and/or a tow truck may be dispatched to the location of the collision, while in other instances, the autonomous vehicle may be temporarily taken out of service and directed to return to a service center for inspection.

In step 516, the autonomous vehicle returns to normal operation, as the predicted collision did not occur.

FIG. 6 is a flowchart illustrating an example alternative method 600 for a collision detector system for an autonomous vehicle rideshare service in accordance with features of embodiments described herein.

In step 602, operation or initiation of the collision detector system may be triggered by receipt of a CID signal from a CID of the autonomous vehicle. As described above, in particular embodiments, the CID signal may include information regarding one or more of a timing of the predicted collision (e.g., within two seconds), classification the object (s) involved in the predicted collision, location(s) of the object(s) involved in the predicted collision, and motion (e.g., speed, rate of acceleration, and/or direction of travel) of the object(s) in the predicted collision. In certain embodiments, the information received from the CID in the CID signal provides context to the collision detector system regarding the predicted collision to provide the collision detector with a "starting point" from which to monitor the predicted collision.

In step 604, LIDAR data (e.g., in the form of a LIDAR point cloud) from the autonomous vehicle's onboard LIDAR sensor(s) may be processed to determine whether the LIDAR data can be used to confirm that the predicted collision actually occurred. As previously noted, due to their location and position on the autonomous vehicle, onboard LIDAR sensors may have blind spots with respect to certain areas around the vehicle; therefore, it is possible that the LIDAR data alone cannot be used to confirm whether or not the predicted collision has occurred.

Substantially contemporaneously with step 604, in step 606, camera data (e.g., in the form of images) from the autonomous vehicle's onboard camera(s) may be processed to determine whether the camera data can be used to positively confirm that the predicted collision actually occurred. Camera data may cover some or all of the potential blind spots of an autonomous vehicle's LIDAR sensor(s); however, as also previously noted, onboard cameras may also have blind spots that may overlap with the blind spots of the LIDAR sensor(s); therefore, it is possible that the camera data alone cannot be used to positively confirm whether or not the predicted collision has occurred.

Substantially contemporaneously with steps 604 and 606, in step 608, IMU data from the autonomous vehicle's onboard IMU sensor(s) may be processed to determine whether the IMU data can be used to positively confirm that the predicted collision actually occurred. Due to the location of onboard IMU sensor(s), it is possible (e.g., in cases where the collision was light or occurred in an area of the autonomous vehicle that was not near an onboard IMU, IMU data may have blind spots that may overlap with the blind spots of a LIDAR sensor and/or that of a camera; therefore, it is possible that the IMU data alone cannot be used to positively confirm whether or not the predicted collision has occurred.

In step 610, a determination is made whether or not, based on one or more of the information included in the CID signal, the LIDAR data, the camera data, and the IMU data, are considered the predicted collision has occurred. If so, execution proceeds to step 612; otherwise, execution proceeds to step 614.

In step 612, action is taken in response to confirmation of the collision. For example, the collision may be reported to the fleet management system and/or to a remote assistance operator so that appropriate action may be taken to address the situation. In certain embodiments, the collision detection system may further determine a severity of the confirmed collision (e.g., using the CID information combined with the LIDAR, camera, and/or IMU data), which may be used to decide how to address the collision. For example, in some instances, a repair technician and/or a tow truck may be dispatched to the location of the collision, while in other instances, the autonomous vehicle may be temporarily taken out of service and directed to return to a service center for inspection.

In step 614, the autonomous vehicle returns to normal operation, as the predicted collision did not occur.

In certain embodiments, information received from the CID may be used to filter the sensor data such that only data that is relevant to the predicted collision is considered by the collision detector. For example, for a predicted collision with the rear of an autonomous vehicle, data from a camera facing the front of the vehicle would not be useful in confirming whether or not the predicted collision actually took place. Similarly, information received from the CID may be used to "tune" or weight the sensor data, especially IMU data. For example, if the CID indicates that a truck traveling at high speed is predicted to collide with the autonomous vehicle, an IMU signal of a certain level (i.e., corresponding to a severe collision) would be expected than if the CID indicates that a bicycle traveling at a relatively low speed is predicted to collide with the autonomous vehicle.

In additional embodiments, data from other sensors (e.g., TARC, microphones, etc.) may be used in addition to and/or in place of one or more of the above-noted sensors to implement the collision detector system.

Although the operations of the example methods shown in FIGS. 5-6 are illustrated as occurring once each and in a particular order, it will be recognized that the operations may be performed in any suitable order and repeated as desired. Additionally, one or more operations may be performed in parallel. Furthermore, the operations illustrated in FIGS. 5-6 may be combined or may include more or fewer details than described.

SELECT EXAMPLES

Example 1 provides a method comprising receiving an indication that a collision between an autonomous vehicle and an object is predicted to occur within a predetermined time; processing first sensor data obtained from a first onboard sensor of the autonomous vehicle to determine whether an actual occurrence of the predicted collision can be confirmed from the first sensor data; if the actual occurrence of the predicted collision cannot be confirmed from the first sensor data, processing second sensor data obtained from a second onboard sensor of the autonomous vehicle to determine whether the actual occurrence of the predicted collision can be confirmed from the second sensor data; and, if the actual occurrence of the predicted collision is confirmed from one of the first sensor data and the second sensor data, determining a severity of the collision based on the indication and the one of the first sensor data and the second sensor data; and prompting an action to be based on the determined severity of the collision.

Example 2 provides the method of example 1, further including, if the actual occurrence of the predicted collision cannot be confirmed from the second sensor data, processing third sensor data obtained from a third onboard sensor of the autonomous vehicle to determine whether the actual occurrence of the predicted collision can be confirmed from the third sensor data.

Example 3 provides the method of example 2, wherein the first onboard sensor comprises at least one light detection and ranging (LIDAR) sensor, the second onboard sensor comprises at least one camera, and the third onboard sensor comprises an inertial measurement unit (IMU).

Example 4 provides the method of any of examples 1-3, wherein the prompted action comprises at least one of stopping the autonomous vehicle, alerting a remote assistance operator, and causing the autonomous vehicle to proceed to a service center.

Example 5 provides the method of any of examples 1-4, further including, if the predicted collision has not occurred, causing the autonomous vehicle to continue on a present route.

Example 6 provides the method of any of examples 1-5, wherein the indication includes at least one of a projected time of the predicted collision, a classification of the object, a location of the collision, a rate of acceleration of the object, a speed of the object, and a direction of travel of the object.

Example 7 provides the method of any of examples 1-5, wherein the sensor data is filtered and weighted based on the indication.

Example 8 provides a method including receiving an indication that a collision between an autonomous vehicle and an object is predicted to occur within a predetermined amount of time; confirming based on the indication and sensor data from a combination of onboard sensors of the autonomous vehicle whether the predicted collision has occurred; and, if it is confirmed that the predicted collision has occurred determining a severity of the collision based on the indication and the sensor data; and initiating an action in connection with the autonomous vehicle based on the determined severity of the collision.

Example 9 provides the method of example 8, wherein the initiated action comprises at least one of stopping the autonomous vehicle, alerting a remote assistance operator to the collision, and causing the autonomous vehicle to proceed to a service center.

Example 10 provides the method of any of examples 8-9, wherein the sensor data comprises a Light Detection and Ranging (LIDAR) point cloud, a camera image, and an IMU signal.

Example 11 provides the method of any of examples 8-10, further including, if the predicted collision is not confirmed to have occurred, causing the autonomous vehicle to continue on a current route.

Example 12 provides the method of any of examples 8-11, wherein the indication includes a projected time of the predicted collision.

Example 13 provides the method of any of examples 8-12, wherein the indication comprises a classification of the object.

Example 14 provides the method of any of examples 8-13, wherein the indication comprises a location of the collision.

Example 15 provides the method of any of examples 8-14, wherein the indication comprises at least one of a rate of acceleration of the object, a speed of the object, and a direction of travel of the object.

Example 16 provides the method of any of examples 8-15, wherein the sensor data is filtered based on the indication.

Example 17 provides the method of any of examples 8-16, wherein the sensor data is weighted based on the indication.

Example 18 provides a system for confirming occurrence of a collision involving an autonomous vehicle and an object, the system including a plurality of onboard sensors for generating sensor data related to an environment of the autonomous vehicle; and a collision detection module configured to receive an indication that a collision between the autonomous vehicle and the object is predicted to occur within a predetermined amount of time; process first sensor data obtained from a first onboard sensor of the autonomous vehicle to determine whether an actual occurrence of the predicted collision can be confirmed from the first sensor data; and, if the actual occurrence of the predicted collision cannot be confirmed from the first sensor data, process second sensor data obtained from a second onboard sensor of the autonomous vehicle to determine whether the actual occurrence of the predicted collision can be confirmed from the second sensor data.

Example 19 provides the system of example 18, wherein the collision detection module is further configured to, if the actual occurrence of the predicted collision is confirmed from one of the first sensor data and the second sensor data, determine a severity of the collision based on the indication and the one of the first sensor data and the second sensor data and prompt an action to be based on the determined severity of the collision.

Example 20 provides the system of any of examples 18-19, wherein the collision detection module is further configured to if the actual occurrence of the predicted collision cannot be confirmed from the second sensor data, process third sensor data obtained from a third onboard sensor of the autonomous vehicle to determine whether the actual occurrence of the predicted collision can be confirmed from the third sensor data.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
   receiving an indication that a collision between a vehicle and an object is predicted to occur within a predetermined time;
   processing first sensor data obtained from a first onboard sensor of the vehicle to determine whether an actual occurrence of the predicted collision can be confirmed from the first sensor data;
   if the actual occurrence of the predicted collision cannot be confirmed from the first sensor data, processing second sensor data obtained from a second onboard sensor of the vehicle to determine whether the actual occurrence of the predicted collision can be confirmed from the second sensor data; and
   if the actual occurrence of the predicted collision is confirmed from one of the first sensor data and the second sensor data:
      determining a severity of the collision based on the indication and the one of the first sensor data and the second sensor data; and
      prompting an action to be based on the determined severity of the collision.

2. The method of claim 1, further comprising:
   if the actual occurrence of the predicted collision cannot be confirmed from the second sensor data, processing third sensor data obtained from a third onboard sensor of the vehicle to determine whether the actual occurrence of the predicted collision can be confirmed from the third sensor data.

3. The method of claim 2, wherein the first onboard sensor comprises at least one light detection and ranging (LIDAR) sensor, the second onboard sensor comprises at least one camera, and the third onboard sensor comprises an inertial measurement unit (IMU).

4. The method of claim 1, wherein the prompted action comprises at least one of stopping the vehicle, alerting a remote assistance operator, and causing the vehicle to proceed to a service center.

5. The method of claim 1, further comprising:
if the predicted collision has not occurred, causing the vehicle to continue on a present route.

6. The method of claim 1, wherein the indication includes at least one of a projected time of the predicted collision, a classification of the object, a location of the collision, a rate of acceleration of the object, a speed of the object, and a direction of travel of the object.

7. The method of claim 1, wherein the first sensor data is filtered and weighted based on the indication.

8. A method comprising:
receiving an indication that a collision between a vehicle and an object is predicted to occur within a predetermined amount of time;
confirming based on the indication and sensor data from a combination of onboard sensors of the vehicle whether the predicted collision has occurred; and
if it is confirmed that the predicted collision has occurred:
determining a severity of the collision based on the indication and the sensor data; and
initiating an action in connection with the vehicle based on the determined severity of the collision.

9. The method of claim 8, wherein the initiated action comprises at least one of stopping the vehicle, alerting a remote assistance operator to the collision, and causing the vehicle to proceed to a service center.

10. The method of claim 8, wherein the sensor data comprises a Light Detection and Ranging (LIDAR) point cloud, a camera image, and an IMU signal.

11. The method of claim 8, further comprising:
if the predicted collision is not confirmed to have occurred, causing the vehicle to continue on a current route.

12. The method of claim 8, wherein the indication includes a projected time of the predicted collision.

13. The method of claim 8, wherein the indication comprises a classification of the object.

14. The method of claim 8, wherein the indication comprises a location of the collision.

15. The method of claim 8, wherein the indication comprises at least one of a rate of acceleration of the object, a speed of the object, and a direction of travel of the object.

16. The method of claim 8, wherein the first sensor data is filtered based on the indication.

17. The method of claim 8, wherein the fist sensor data is weighted based on the indication.

18. A system for confirming occurrence of a collision involving a vehicle and an object, the system comprising:
a plurality of onboard sensors for generating sensor data related to an environment of the vehicle; and
a collision detection module configured to:
receive an indication that a collision between the vehicle and the object is predicted to occur within a predetermined amount of time;
process first sensor data obtained from a first onboard sensor of the vehicle to determine whether an actual occurrence of the predicted collision can be confirmed from the first sensor data; and
if the actual occurrence of the predicted collision cannot be confirmed from the first sensor data, process second sensor data obtained from a second onboard sensor of the vehicle to determine whether the actual occurrence of the predicted collision can be confirmed from the second sensor data.

19. The system of claim 18, wherein the collision detection module is further configured to:
if the actual occurrence of the predicted collision is confirmed from one of the first sensor data and the second sensor data:
determine a severity of the collision based on the indication and the one of the first sensor data and the second sensor data; and
prompt an action to be based on the determined severity of the collision.

20. The system of claim 18, wherein the collision detection module is further configured to:
if the actual occurrence of the predicted collision cannot be confirmed from the second sensor data, process third sensor data obtained from a third onboard sensor of the vehicle to determine whether the actual occurrence of the predicted collision can be confirmed from the third sensor data.

* * * * *